(12) United States Patent
Mashima et al.

(10) Patent No.: US 10,696,780 B2
(45) Date of Patent: Jun. 30, 2020

(54) EPOXY RESIN COMPOSITION

(71) Applicant: THREEBOND CO., LTD., Hachioji-shi, Tokyo (JP)

(72) Inventors: Miki Mashima, Hachioji (JP); Tatsuya Moritoki, Hachioji (JP); Eiji Shimokawa, Hachioji (JP)

(73) Assignee: THREEBOND CO., LTD., Hachioji-shi, Tokyo (JP)

( * ) Notice: Subject to any disclaimer, the term of this patent is extended or adjusted under 35 U.S.C. 154(b) by 0 days.

(21) Appl. No.: 15/631,790

(22) Filed: Jun. 23, 2017

(65) Prior Publication Data
US 2017/0369629 A1    Dec. 28, 2017

(30) Foreign Application Priority Data
Jun. 28, 2016    (JP) .................. 2016-127148

(51) Int. Cl.
| | |
|---|---|
| C08G 18/58 | (2006.01) |
| C08G 59/40 | (2006.01) |
| C08G 18/48 | (2006.01) |
| C08G 18/75 | (2006.01) |
| C08L 63/00 | (2006.01) |
| C08G 59/42 | (2006.01) |
| C09D 163/10 | (2006.01) |

(52) U.S. Cl.
CPC ......... *C08G 18/58* (2013.01); *C08G 18/4825* (2013.01); *C08G 18/755* (2013.01); *C08G 59/4021* (2013.01); *C08G 59/4253* (2013.01); *C08L 63/00* (2013.01); *C09D 163/10* (2013.01)

(58) Field of Classification Search
CPC .................................................. C08G 18/58
See application file for complete search history.

(56) References Cited

U.S. PATENT DOCUMENTS

| | | | | |
|---|---|---|---|---|
| 2004/0034142 A1* | 2/2004 | Kawakami | .............. | C08L 51/04 524/417 |
| 2004/0075802 A1* | 4/2004 | Kitamura | ............. | C08G 59/621 349/153 |
| 2005/0070634 A1 | 3/2005 | Lutz et al. | | |
| 2007/0129509 A1* | 6/2007 | Li | .......................... | C08G 18/10 525/526 |
| 2008/0251202 A1* | 10/2008 | Eagle | ................... | C08G 59/066 156/330 |
| 2008/0251203 A1* | 10/2008 | Lutz | ....................... | C08G 18/10 156/330 |
| 2009/0048370 A1 | 2/2009 | Lutz et al. | | |
| 2011/0319525 A1 | 12/2011 | Maeda et al. | | |
| 2013/0056153 A1* | 3/2013 | Czaplicki | ........... | C08G 59/4021 156/330 |
| 2018/0094176 A1* | 4/2018 | Okamoto | ............... | C09J 175/08 |

FOREIGN PATENT DOCUMENTS

| | | |
|---|---|---|
| CN | 101691418 A | 4/2010 |
| CN | 101778901 A | 7/2010 |
| CN | 102341429 A | 2/2012 |
| JP | H02-150484 A | 6/1990 |
| JP | 2012-219223 A | 11/2012 |

OTHER PUBLICATIONS

English language machine translation of JP 2012-219223 (Year: 2012).*
China Patent Office, "Office Action for Chinese Patent Application No. 201710507545.5," dated Mar. 27, 2020.

* cited by examiner

*Primary Examiner* — Megan McCulley
(74) *Attorney, Agent, or Firm* — Manabu Kanesaka

(57) ABSTRACT

In developing epoxy resin compositions used as an adhesive for structure (structural adhesive) required to have adhesive properties, if each component is increased to further enhance the adhesive properties such as shear bond strength and peel strength, this causes problems, for example, as follows. The viscosity becomes so high that the workability deteriorates. Hence, the added amount has to be limited. Moreover, the cured product becomes excessively flexible, so that the shear bond strength deteriorates. An epoxy resin composition contains the following components (A) to (E), where the component (A) does not include the component (C): the component (A): an epoxy resin; the component (B): a blocked urethane resin; the component (C): a rubber-modified epoxy resin; the component (D): rubber particles; and the component (E): a latent curing agent.

13 Claims, No Drawings

EPOXY RESIN COMPOSITION

RELATED APPLICATIONS

The present application is based on, and claims priority from, Japanese Application No. JP2016-127148 filed Jun. 28, 2016, the disclosure of which is hereby incorporated by reference herein in its entirety.

TECHNICAL FIELD

The present invention relates to an epoxy resin composition.

BACKGROUND ART

Conventionally, epoxy resin compositions have been widely used for components of electrical and electronic equipment, automobile parts, aircraft parts, construction materials, and so forth because of excellent adhesive force to various members and excellent durability. However, cured products of such epoxy resin compositions used in adhesives are hard and brittle, and hence easily broken when impact is applied thereto. For this reason, studies have been conventionally conducted to impart toughness by adding elastomer components or using elastomer-modified epoxy resins without deteriorating the basic properties of the epoxy resins.

Patent Literature 1 describes an epoxy resin composition usable as adhesion for structure and containing an epoxy resin, a rubber-modified epoxy resin, a urethane resin in which the terminal isocyanate of the urethane prepolymer is blocked, and a curing agent.

Patent Literature 2 describes an adhesive for automobile structure, which contains an epoxy resin, a urethane-modified epoxy resin, a NBR-modified epoxy resin, a NBR-rubber-particle dispersed epoxy resin, and a latent curing agent.

CITATION LIST

Patent Literatures

[Patent Literature 1] Japanese Patent Application Publication No. 2012-219223

[Patent Literature 2] Japanese Patent Application Publication No. Hei 2-150484

SUMMARY OF INVENTION

Technical Problems

However, in developing epoxy resin compositions used as adhesives for structure (structural adhesives) required to have adhesive properties, if the contents of the rubber-modified epoxy resin component, the urethane resin component in which the terminal isocyanate of the urethane prepolymer is blocked, and the rubber-particle dispersed epoxy resin component are increased to further enhance the adhesive properties such as shear bond strength and peel strength, this causes problems, for example, as follows. The viscosity becomes so high that the workability deteriorates. Hence, the added amounts have to be limited. Moreover, the cured product becomes excessively flexible, so that the shear bond strength deteriorates.

In view of the above-described problems, an object of the present invention is to provide an epoxy resin composition having higher adhesive properties.

Solution to Problems

Next, the gist of the present invention will be described. A first aspect of the present invention is an epoxy resin composition comprising the following components (A) to (E), wherein the component (A) does not include the component (C):

the component (A): an epoxy resin;
the component (B): a blocked urethane resin;
the component (C): a rubber-modified epoxy resin;
the component (D): rubber particles; and
the component (E): a latent curing agent.

Note that, as the components (A) to (E) of the present invention and optional components to be described later, it is possible to use any combination that satisfies any one of the following requirements.

A second aspect of the present invention is the epoxy resin composition according to the first aspect, wherein the component (D) is selected from the group consisting of acrylic rubbers and butadiene rubbers.

A third aspect of the present invention is the epoxy resin composition according to the first or second aspect, wherein the component (E) is selected from the group consisting of dicyandiamide and derivatives thereof, amine adduct compounds, as well as urea compounds and derivatives thereof.

A fourth aspect of the present invention is the epoxy resin composition according to any one of the first to third aspects, comprising 3 to 30 parts by mass of the component (B) and 3 to 30 parts by mass of the component (D) relative to 100 parts by mass of a total of the components (A) and (C), and 1 to 16% by mass of the component (C) in the total of the components (A) and (C).

A fifth aspect of the present invention is a thermosetting-type adhesive for structure comprising the epoxy resin composition according to any one of the first to fourth aspects.

In addition, the present invention may include aspects as follows.

[1]

An epoxy resin composition comprising the following components (A) to (E), wherein the component (A) does not include the component (C):

the component (A): an epoxy resin;
the component (B): a blocked urethane resin;
the component (C): a rubber-modified epoxy resin;
the component (D): rubber particles; and
the component (E): a latent curing agent.

[2]

The epoxy resin composition according to [1], wherein the component (D) is selected from the group consisting of acrylic rubbers and butadiene rubbers.

[3]

The epoxy resin composition according to [1], wherein the component (E) is selected from the group consisting of dicyandiamide and derivatives thereof, amine adduct compounds, as well as urea compounds and derivatives thereof.

[4]

The epoxy resin composition according to [1], comprising 3 to 30 parts by mass of the component (B) and 3 to 30 parts by mass of the component (D) relative to 100 parts by mass of a total of the components (A) and (C), and 1 to 16% by mass of the component (C) in the total of the components (A) and (C).

[5]

The epoxy resin composition according to [1], wherein the component (B) is a blocked urethane resin obtained from a urethane resin formed by reacting a polyalkylene polyol with a polyisocyanate compound.

[6]

The epoxy resin composition according to [1], further comprising an inorganic powder.

[7]

A thermosetting-type adhesive for structure comprising the epoxy resin composition according to any one of [1] to [6].

[8]

A cured product obtained by curing the epoxy resin composition according to any one of [1] to [6].

[9]

An adherend adhesion method comprising the steps of:
  disposing the epoxy resin composition according to any one of [1] to [6] between a pair of adherends; and
  curing the epoxy resin composition by heating.

[10]

A method for producing an epoxy resin composition, comprising the steps of:
  blending the following components (A) to (E)
  the component (A): an epoxy resin,
  the component (B): a blocked urethane resin,
  the component (C): rubber-modified epoxy resin,
  the component (D): rubber particles, and
  the component (E): a latent curing agent; and
  mixing the obtained blend at a temperature of 10 to 40° C. for 0.1 to 5 hours.

Advantageous Effects of Invention

The present invention provides an epoxy resin composition for structure having both a high shear bond strength and a high peel strength.

DESCRIPTION OF EMBODIMENTS

Hereinafter, details of the invention will be described.

<Component (A)>

A component (A) of the present invention is not particularly limited, as long as it is an epoxy resin. The component (A) includes compounds having two or more glycidyl groups per molecule, and the like. Moreover, as the component (A), it is possible to suitably use products obtained by condensation between epichlorohydrin and polyhydric alcohols or polyhydric phenols such as bisphenols, or other similar products. Note that the component (A) includes components other than components (B) and (C) to be described later.

The component (A) is not particularly limited. Examples thereof include bisphenol A-type epoxy resins, bisphenol F-type epoxy resins, bisphenol S-type epoxy resins, bisphenol AD-type epoxy resins, naphthalene type epoxy resins, biphenyl type epoxy resins, glycidyl amine-type epoxy resins, brominated bisphenol A-type epoxy resins, hydrogenated bisphenol A-type epoxy resins, cyclic epoxy resins, dicyclopentadiene type epoxy resins, phenol novolac-type epoxy resins, orthocresol novolac-type epoxy resins, urethane-modified epoxy resins, and the like. Besides, the examples include glycidyl ester-type epoxy resins obtained by condensation between epichlorohydrin and carboxylic acids such as phthalic acid derivatives or fatty acids, and further epoxy resins modified by various methods. Each of these may be used alone, or two or more thereof may be used in mixture. Among these components (A), bisphenol A-type epoxy resins, bisphenol F-type epoxy resins, and naphthalene type epoxy resins are preferable from the viewpoint that the raw materials are inexpensive and readily available.

The component (A) of the present invention has an epoxy equivalent weight preferably within a range of 100 to 500 g/eq, more preferably within a range of 120 to 400 g/eq, and particularly preferably within a range of 140 to 300 g/eq. The component (A) within the range makes it possible to obtain an epoxy resin composition having high adhesive properties. Herein, the epoxy equivalent weight is measured based on the method specified in JIS K 7236.

Examples of commercial products of the component (A) include, but are not limited to, jER 828, 827, 801, 806, 807, 152, 604, 630, 871, YX8000, YX8034 (manufactured by Mitsubishi Chemical Corporation), EPICLON 830, EXA-830LVP, EXA-850CRP, EXA-835LV, HP4032D, HP820 (manufactured by DIC Corporation), EP4100, EP4000, EP4000G, EP4000E, EP4000TX, EP4400, EP4520S, EP4530, EP4901, EP4080, EP4088, EPU6, EP49-10N (manufactured by ADEKA Corporation), Denacol EX614B, EX411, EX314, EX201, EX212, EX252 (manufactured by Nagase ChemteX Corporation), EPIOL G-100, EPIOL E-100LC, MARPROOF G-1005S (manufactured by NOF Corporation), TEPIC-PAS (manufactured by Nissan Chemical Industries, Ltd.), and the like. Each of these may be used alone, or two or more thereof may be used in mixture.

<Component (B)>

A component (B) of the present invention is a blocked urethane resin. In the present invention, the term blocked urethane resin refers to a compound formed by blocking, using a blocking agent, the reactive isocyanate group remaining at the end of the molecular chain or in the molecular chain of a urethane resin (polyurethane) which is a reaction product between a polyisocyanate compound and a polyol compound. Herein, blocking and similar terms mean stabilizing the reactive isocyanate group by reacting the reactive isocyanate group with the blocking agent, thereby preventing the reactive isocyanate group from reacting until a predetermined temperature is reached by heating. In other words, the blocked urethane resin as the component (B) of the present invention has enhanced properties such as storage stability and solvent stability by protecting, using a blocking agent, the isocyanate group present in the urethane backbone of a urethane resin (polyurethane) obtained by reacting an isocyanate with a polyamine or polyol.

The polyamine compound refers to a compound having two or more amino groups in the molecule, and is not particularly limited. The polyamine compound includes ethylenediamine, hexamethylenediamine, and the like.

The polyol compound refers to a compound having two or more hydroxyl groups in the molecule, and is not particularly limited. The polyol compound includes polyester polyols (including polycarbonate polyols), polyether polyols, and polyalkylene polyols including polyalkylene glycols such as polypropylene glycol.

The polyisocyanate compound refers to a compound having two or more isocyanate group in the molecule, and is not particularly limited. The polyisocyanate compound includes various isocyanate compounds such as isophorone diisocyanate, hexamethylene diisocyanate, toluylene diisocyanate, trimethylhexamethylene diisocyanate, diisocyanatodiphenylmethane, diisocyanatotoluene, tetramethylxylene diisocyanate, diisocyanatodicyclohexylmethane, diphenylmethane diisocyanate, xylylene diisocyanate, tolylene diisocyanate, trimethylbenzene triisocyanate, and lysine triisocyanate.

The isocyanate blocking agent is not particularly limited. The isocyanate blocking agent includes oximes such as acetoxime, 2-butanone oxime, 3-methyl-2-butanone oxime, 2-heptanone oxime, 2-pentanone oxime, 3-pentanone oxime, 4-methyl-2-pentanone oxime, 3-heptanone oxime, cyclohexanone oxime, and acetophenone oxime; lactams such as β-methyl-β-butyrolactam, α,β-dimethylbutyrolactam, α,α',β-trimethylbutyrolactam, β-carbomethoxy-β-butyrolactam, β-phenyl-β-propiolactam, β-methyl-β-caprolactam, β-methyl-β-valerolactam, β-ethyl-β-valerolactam, 3-methyl-s-caprolactam, 7-methyl-s-caprolactam, 2-pyrrolidone, and 6-methyl-2-piperidone; oxazolidines, ketimines, acetohydroxamic acid esters, benzohydroxamic acid esters, hydroxamic acid esters such as benzyl methacryloyl hydroxamate; phenols; and the like.

The amount of the component (B) blended is not particularly limited. Relative to 100 parts by mass of a total of the components (A) and (C), the component (B) can be incorporated in an amount of 3 to 30 parts by mass, more preferably 3 to 25 parts by mass, and particularly preferably 3 to 20 parts by mass. The component (B) in an amount of 3 parts by mass or more makes it possible to maintain a high peel strength. Meanwhile, the component (B) in an amount of 30 parts by mass or less makes it possible to maintain a favorable workability and to maintain a high shear bond strength.

A particularly preferable component (B) includes a blocked urethane resin having a polypropylene structure. The blocked urethane resin having a polypropylene structure is obtained by: reacting a polyisocyanate compound with a polyol having a polypropylene structure (polypropylene polyol); and blocking (protecting), using the above-described blocking agent, the reactive isocyanate group present in the urethane backbone of the obtained reaction product, specifically, at the end of or in the molecular chain thereof. Specific examples of preferable blocked urethane resins of the present invention include blocked urethane resins obtained from urethane resins formed by reacting polyalkylene polyols with polyisocyanate compounds, that is, blocked urethane resins obtained by blocking, using the above-described blocking agent, the reactive isocyanate groups of urethane resins each containing constitutional units of a polyalkylene polyol and an isocyanate compound. Particularly, preferable blocked urethane resins include a blocked urethane resin obtained from polypropylene glycol and isophorone diisocyanate (isophorone diisocyanate-based blocked isocyanate), and other similar blocked urethane resins. Commercial products of the component (B) include, but are not limited to, BEDROCK D-500, D-550, DK-980 (manufactured by DIC Corporation), Adeka Resin QR-9466 (manufactured by ADEKA Corporation), Elastron E-37, H-3, H-38, MF-25K (manufactured by DKS Co. Ltd.), Meikanate DM-3031CONC, TP-10, CX (manufactured by Meisei Chemical Works, Ltd.), KARENZ MOI-BM (manufactured by Showa Denko K.K.), and the like. Each of these may be used alone, or two or more thereof may be used in mixture.

<Component (C)>

A component (C) of the present invention is a rubber-modified epoxy resin. Herein, a rubber-modified epoxy resin is obtained by reacting (modifying) an epoxy group in an epoxy resin with a rubber component. In addition, herein, the component (C) is not included in the component (A).

The epoxy resin refers to a compound having one or more glycidyl groups in the molecule, and is not particularly limited. Examples of the epoxy resin include bisphenol A-type epoxy resins, bisphenol F-type epoxy resins, bisphenol S-type epoxy resins, bisphenol AD-type epoxy resins, naphthalene type epoxy resins, biphenyl-type epoxy resins, glycidyl amine-type epoxy resins, brominated bisphenol A-type epoxy resins, hydrogenated bisphenol A-type epoxy resins, cyclic epoxy resins, dicyclopentadiene type epoxy resins, phenol novolac-type epoxy resins, orthocresol novolac-type epoxy resins, and the like. Besides, the examples include glycidyl ester-type epoxy resins obtained by condensation between epichlorohydrin and carboxylic acids such as phthalic acid derivatives or fatty acids, and further epoxy resins modified by various methods. Each of these may be used alone, or two or more thereof may be used in mixture.

The rubber component refers to a rubber having a functional group reactive with an epoxy group in the epoxy resin, and is not particularly limited. Examples of the rubber component include butadiene rubbers, acrylic rubbers, silicone rubbers, butyl rubbers, olefin rubbers, styrene rubbers, NBR, SBR, IR, EPR, and the like. The functional group of the rubber component includes amino-modified, hydroxy-modified, or carboxyl-modified functional groups, and the like. Such a rubber component is reacted with an epoxy resin in an appropriate blending ratio by a known polymerization method, and the resulting product is the rubber-modified epoxy resin used in the present invention. From the viewpoint of adhesion, a NBR-modified epoxy resin is preferable. Each of these may be used alone, or two or more thereof may be used in mixture.

The amount of the component (C) blended is not particularly limited. The amount of the component (C) is 1 to 16% by mass, more preferably 1 to 13% by mass, and particularly preferably 1 to 9% by mass, in the total of the components (A) and (C). The component (C) in an amount of 1% by mass or more makes it possible to maintain a high peel strength. Meanwhile, the component (C) in an amount of 16% by mass or less makes it possible to maintain a high shear bond strength.

Commercial products of the component (C) include, but are not limited to, EPICLON TSR-960, TSR-601 (manufactured by DIC Corporation), Adeka Resin EPR-4030, EPR-1415-1 (manufactured by ADEKA Corporation), SUMI-EPDXY ESC-500 (manufactured by Sumitomo Chemical Co., Ltd.), EPOTOHTO YR-102 (manufactured by Nippon Steel & Sumikin Chemical Co., Ltd.), HyPoxRK84L (manufactured by CVC Thermoset Specialties), and the like. Each of these may be used alone, or two or more thereof may be used in mixture.

<Component (D)>

A component (D) of the present invention is rubber particles. Herein, the term rubber particle refers to a particle having a layer which exhibits a rubber elasticity. The rubber particle may be a particle having only one layer which exhibits a rubber elasticity, or may be a particle having a multi-layer structure which exhibits a rubber elasticity. Alternatively, it is possible to use rubber particles dispersed in advance in such an epoxy resin as the component (A). Specifically, such dispersed rubber particles include rubber particles dispersed in an epoxy resin using a mixing and stirring device such as a hyper or homogenizer, and rubber particles synthesized by emulsion polymerization in an epoxy resin. The rubber particles have an average particle diameter of preferably 0.01 to 1 μm, more preferably 0.05 to 0.5 μm. Note that, unless otherwise particularly stated, a value of an average particle diameter in the present specification is measured according to laser diffraction/scattering methods (ISO 133201 and ISO 9276-1).

The component (D) is not particularly limited. For example, butadiene rubbers, acrylic rubbers, silicone rubbers, butyl rubbers, olefin rubbers, styrene rubbers, NBR, SBR, IR, EPR, or the like are used as the component (D). Above all, butadiene rubbers and acrylic rubbers are preferable from the viewpoint of adhesion.

The amount of the component (D) blended is not particularly limited. Relative to 100 parts by mass of the total of the components (A) and (C), the component (D) can be incorporated in an amount of 3 to 30 parts by mass, more preferably 4 to 25 parts by mass, and particularly preferably 5 to 20 parts by mass. The component (D) in an amount of 3 parts by mass or more makes it possible to maintain a high shear bond strength and a high peel strength. Meanwhile, the component (D) in an amount of 30 parts by mass or less makes it possible to maintain a high shear bond strength.

Commercial products of the butadiene rubbers as the component (D) include METABLEN E-901, C-223E, C-303A, C-140A (manufactured by Mitsubishi Rayon Co., Ltd.), Kane Ace MX-153, MX-136, MX-257, MX-127, and MX-451 (manufactured by Kaneka Corporation). Commercial products of the acrylic rubbers include METABLEN W-300A, W-450A, W-600A, W-377, Dianal LP-4100 (manufactured by Mitsubishi Rayon Co., Ltd.), ACRYSET BPF-307, BPA-328 (manufactured by Nippon Shokubai Co., Ltd.), ZEFIAC F-351G, STAPHYROID AC-3355 (manufactured by Aica Kogyo Company, Limited), and the like. However, the commercial products are not limited to these. Each of these may be used alone, or two or more thereof may be used in mixture. Moreover, like ACRYSET BPF-307 and MX-136 mentioned above, a composition mixture may be used in which the rubber particles of the component (D) is dispersed and mixed in the epoxy resin of the component (A) in advance.

<Component (E)>

A component (E) of the present invention is a latent curing agent. Various latent curing agents can be used, as long as they are capable of curing the epoxy resin components (A) and (C). Herein, the term latent curing agent refers to a compound which has no activity on epoxy resins at room temperature (approximately 25° C.), but which functions to promote the curing when activated by stimulation such as heating through a reaction such as dissolution, breakdown, or transfer reaction. As the latent curing agent activated by heating, conventionally known various substances can be used. Particularly, the activation temperature (heating temperature) is preferably 60 to 180° C., further preferably 80 to 150° C. Examples of such substances include compounds such as dicyandiamide and derivatives thereof, microcapsule type curing agents, hydrazide compounds, amine imides, amine adduct compounds, acid anhydrides, phenol novolacs, urea compounds, and derivatives thereof. More preferable is a latent curing agent containing at least one selected from dicyandiamide and derivatives thereof, amine adduct compounds, as well as urea compounds and derivatives thereof. Particularly preferably, the amine adduct compounds are modified aliphatic polyamine adduct compounds. Moreover, from the viewpoint of curability, two or more latent curing agents are preferably mixed. Examples thereof include, but are not limited to, a mixture of dicyandiamide solid at a normal temperature (approximately 25° C.) and a modified aliphatic polyamine adduct compound with phenyl dimethyl urea, and the like.

The amount of the component (E) blended is not particularly limited. Relative to 100 parts by mass of the total of the components (A) and (C), the component (E) can be incorporated in an amount of 1 to 30 parts by mass, more preferably 2 to 25 parts by mass, and particularly preferably 3 to 20 parts by mass. The component (E) in an amount of 1 part by mass or more makes it possible to maintain a high curability. Meanwhile, the component (E) in an amount of 30 parts by mass or less makes it possible to maintain a high storage stability.

Examples of commercial products of the dicyandiamide and derivatives thereof as the component (E) include jER-CURE DICY7, 15, 20, 7A (manufactured by Mitsubishi Chemical Corporation), OMICURE DDA10, DDA50, DDA100, DDAS, CG-325, DICY-F, DICY-M (manufactured by CVC Thermoset Specialties), CG-1200, CG-1400 (manufactured by Air Products and Chemicals, Inc. in Japan), and the like. Moreover, examples of commercial products of the microcapsule type curing agents and derivatives thereof as the component (E) include Novacure HX-3721, 3722, 3741, 3742, 3748, 3613, 3088, 3921HP, 3941HP (manufactured by Asahi Kasei E-materials Corporation), and the like. Further, examples of the hydrazide compounds as the component (E) include AJICURE VDH, VDH-J, UDH, UDH-J (manufactured by Ajinomoto Fine-Techno Co., Inc.), and the like. Furthermore, examples of the acid anhydrides as the component (E) include RIKACID HNA-100, MH-700, MH-700G, MH, TMEG-S, TMEG-100, TMEG-200, TMEG-500, TMEG-600, DDSA, OSA (manufactured by New Japan Chemical Co., Ltd.), HN-2200, HN-2000, HN-5500, MHAC (manufactured by Hitachi Chemical Company, Ltd.), and the like. Furthermore, examples of the amine adduct compounds as the component (E) include AJICURE PN-23, MY-24, PN-D, MY-D, PN-H, MY-H (manufactured by Ajinomoto Fine-Techno Co., Inc.), FXE-1000, FXR-1030, FXR-1032, FXR-1081 (manufactured by T&K TOKA CO., LTD.), and the like. Further, examples of the urea compounds and derivatives thereof as the component (E) include U-CAT 3512T, 3513N (manufactured by San-Apro Ltd.), OMICURE 94, OMICURE 24, U-201M, U-24, U-35, U-405, U-410, U-415, U-52 (manufactured by CVC Thermoset Specialties), and the like. However, the examples are not limited to these. Each of these may be used alone, or two or more thereof may be used in mixture.

<Optional Components>

In the present invention, an additive can be used, as long as the object of the present invention is not impaired. The additive includes a boric acid ester compound, an inorganic powder, conductive particles, a storage stabilizer, an antioxidant, a light stabilizer, a preservative, a heavy metal deactivator, a silane coupling agent, a tackifier, a plasticizer, a defoamer, a pigment, an anti-rust agent, a leveling agent, a dispersant, a rheology modifier, a flame retardant, and a surfactant, and the like.

In order to enhance the storage stability, a boric acid ester compound may be blended in the epoxy resin composition of the present invention. The boric acid ester compound is not particularly limited. Examples thereof include trimethyl borate, triethyl borate, tri-n-propyl borate, triisopropyl borate, tri-n-butyl borate, tris(2-ethylhexyloxy)borane, triphenyl borate, and the like.

In order to improve the elastic modulus, flowability, and so forth of the cured product, an inorganic powder may be added to the present invention. The inorganic powder and the like are not particularly limited. Examples thereof include glasses, silica, fumed silica, alumina, mica, ceramics, calcium carbonate, aluminum nitride, carbon powder, kaolin clay, dried clay minerals, dried diatomaceous earth, and the like. The amount of the inorganic powder blended is, for example, preferably 0.1 to 200 parts by mass, more preferably 1 to 100 parts by mass, and further preferably 10 to 50 parts by mass, relative to 100 parts by mass of the total of the components (A) and (C).

Conductive particles may be added to the present invention. The conductive particles are not particularly limited. Examples thereof include gold, silver, platinum, nickel, palladium, or plated particles of organic polymer or inorganic polymer particles covered with thin metal films, and other similar conductive particles.

An antioxidant may be added to the present invention. The antioxidant is not particularly limited. Examples thereof include quinone-based compounds such as β-naphthoquinone, 2-methoxy-1,4-naphthoquinone, methylhydroquinone, hydroquinone, hydroquinone monomethyl ether, mono-tert-butyl hydroquinone, 2,5-di-tert-butyl hydroquinone, p-benzoquinone, 2,5-diphenyl-p-benzoquinone, and 2,5-di-tert-butyl-p-benzoquinone; phenols such as phenothiazine, 2,2-methylene-bis(4-methyl-6-tert-butylphenol), catechol, tert-butylcatechol, 2-butyl-4-hydroxyanisole, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3, 5-di-tert-pentylphenyflethyl]-4,6-di-tert-pentylphenyl acrylate, 4,4'-butylidenebis(6-tert-butyl-3-methylphenol), 4,4'-thiobis(6-tert-butyl-3-methylphenol), 3,9-bis[2-[3-(3-tert-butyl-4-hydroxy-5-methylphenyl)propionyloxy]-1,1-dimethylethyl]-2,4,8,10-tetraoxaspiro[5.5]undecane, pentaerythritol tetrakis[3-(3,5-di-tert-butyl-4-hydroxyphenyl) propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diylbis[3-(3, 5-di-tert-butyl-4-hydroxyphenyl)propionamide], benzenepropanoic acid 3,5-bis(1,1-dimethylethyl)-4-hydroxy C7-C9 side chain alkyl esters, 2,4-dimethyl-6-(1-methylpentadecyl)phenol, diethyl[[3,5-bis(1,1-dimethylethyl)-4-hydroxyphenyl]methyl] phosphonate, 3,3',3",5,5', 5"-hexa-tert-butyl-a,a',a"-(mesitylene-2,4,6-tolyl)tri-p-cresol, calcium diethylbis[[3,5-bis(1,1-dimethylethyl)-4-hydroxyphenyl]methyl]phosphonate, 4,6-bis (octylthiomethyl)-o-cresol, ethylene bis(oxyethylene)bis[3-(5-tert-butyl-4-hydroxy-m-tolyl)propionate], hexamethylene bis[3-(3,5-di-tert-butyl-4-hydroxyphenyl) propionate, 1,3,5-tris(3,5-di-tert-butyl-4-hydroxybenzyl)-1, 3,5-triazine-2,4,6(1H,3H,5H)-trione, 1,3,5-tris[(4-tert-butyl-3-hydroxy-2,6-xylyl)methyl]-1,3,5-triazine-2,4,6(1H, 3H,5H)-trione, a reaction product between N-phenylbenzeneamine and 2,4,6-trimethylpentene, 2,6-di-tert-butyl-4-(4,6-bis(octylthio)-1,3,5-triazin-2-ylamino)phenol, picric acid, and citric acid; phosphorus-based compounds such as tris(2,4-di-tert-butylphenyl)phosphite, tris [2-[[2,4,8,10-tetra-tert-butyldibenzo[d,f][1,3,2] dioxaphosphephine-6-yl]oxy]ethyl]amine, bis(2,4-di-tert-butylphenyl)pentaerythritol diphosphite, phosphorous acid bis[2,4-bis(1,1-dimethylethyl)-6-methylphenyl]ethyl ester, tetrakis(2,4-di-tert-butylphenyl)[1,1-bisphenyl]-4,4'-diyl-bisphosphonite, and 6-[3-(3-tert-butyl-4-hydroxy-5-methyl-phenyl)propoxy]-2,4,8,10-tetra-tert-butyldibenz[d,f][1,3,2] dioxaphosphephine; sulfur-based compounds such as dilauryl 3,3'-thiodipropionate, dimyristyl 3,3'-thiodipropionate, distearyl 3,3'-thiodipropionate, pentaerythrityl tetrakis(3-laurylthiopropionate), and 2-mercaptobenzimidazole; amine-based compounds such as phenothiazine, lactone-based compounds, vitamin E-based compounds, and the like.

A silane coupling agent may be added to the present invention. The silane coupling agent is not particularly limited. Examples thereof include γ-chloropropyltrimethoxysilane, octenyltrimethoxysilane, glycidoxyoctyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, p-styryltrimethoxysilane, and the like.

The epoxy resin composition of the present invention can be produced by conventionally known methods. For example, predetermined amounts of the components (A) to (E) are blended, and mixed using mixing means such as a three roll mill or a planetary mixer at a temperature of preferably 10 to 40° C., more preferably 20 to 30° C., and further preferably normal temperature (25° C.), preferably for 0.1 to 5 hours, more preferably 0.2 to 2 hours, and further preferably 1 hour and 30 minutes±20 minutes. In this manner, the epoxy resin composition can be produced.

The epoxy resin composition of the present invention is usable for adherend adhesion. The adherend adhesion method includes, for example, the steps of: first disposing the above-described epoxy resin composition between a pair of adherends; and curing the epoxy resin composition by heating.

The epoxy resin composition of the present invention is disposed between a pair of adherends. Specifically, for example, the epoxy resin composition is disposed on one of the adherends by dripping, applying, or other ways. The other adherend is placed on the epoxy resin composition thus disposed. Then, the pair of adherends are positioned by adjusting the positions at will. For the application, for example, known sealant or adhesive application methods may be adopted. For example, it is possible to adopt a method such as dispensing, spraying, ink-jetting, screen printing, gravure printing, dipping, or spin coating, which may use an automated application system. As the adherends, for example, glasses, plastics, or the like can be used. The adherends may be transparent, semi-transparent, or opaque.

The disposed epoxy resin composition is further heated at a predetermined temperature, so that the epoxy resin composition is completely cured, forming a cured product. Thus, the pair of adherends completely adhere thereto. The heating temperature is, for example, appropriately 50° C. to 200° C., preferably 60° C. to 180° C., more preferably 70° C. to 160° C., further preferably 80° C. to 150° C., and still further preferably 120° C.±5° C.

The usage of the epoxy resin composition of the present invention suitably used includes covering agents, casting resins, sealants, potting agents, coating agents, lining materials, inks, and the like. Above all, since a cured product having a high shear bond strength and a high peel strength is obtained from the epoxy resin composition, an adhesive for structure is particularly preferable. Where the adhesive for structure is used includes automobile bodies, automobile parts, machine tools, aircraft parts, motors, power generators, substations, other parts requiring welding, and the like.

EXAMPLES

Hereinafter, the present invention will be described in more details byway of Examples. However, the present invention is not limited to these Examples.

The raw materials used in Examples and Comparative Examples are as follows. Hereinafter, epoxy resin compositions are also referred to simply as compositions.
<Component (A)>
a1: a bisphenol A-type epoxy resin having an epoxy equivalent weight of 184 to 194 g/eq (jER 828, manufactured by Mitsubishi Chemical Corporation)
<Component (B)>
b1: a blocked urethane resin having a polypropylene glycol structure (QR-9466 (isophorone diisocyanate-based blocked isocyanate, the blocked NCO equivalent weight was 220), manufactured by ADEKA Corporation)
<Comparative Component of Component (B)>
b'1: a urethane-modified epoxy resin (EPU-73B, manufactured by ADEKA Corporation)
<Component (C)>
c1: a NBR-modified epoxy resin (EPR-1415-1, manufactured by ADEKA Corporation)
<Component (D)>
d1: core-shell particles mainly containing an acrylic copolymer and having an average particle diameter of 0.3 μm (F351G, manufactured by Aica Kogyo Company, Limited)
d2: a 20%-acrylic-rubber-particle dispersed bisphenol F-type epoxy resin having an average particle diameter of 0.3 μm (ACRYSET BPF-307, manufactured by Nippon Shokubai Co., Ltd.)
d3: a 25%-butadiene-rubber-particle dispersed bisphenol F-type epoxy resin having an average particle diameter of 0.1 μm (MX-136, manufactured by Kaneka Corporation)
<Component (E)>
e1: dicyandiamide (jERCURE DDA7, manufactured by Mitsubishi Chemical Corporation)
e2: a modified aliphatic polyamine adduct compound (FXE-1030, manufactured by T&K TOKA CO., LTD.)
e3: phenyl dimethyl urea (U-CAT 3512T, manufactured by San-Apro Ltd.)
<Inorganic Powder>
calcium carbonate (Whiton B, manufactured by Bihoku Funka Kogyo Co., Ltd.)
<Preparation of Epoxy Resin Compositions>

The components (A) to (C) were collected (but not d2 and d3), mixed and stirred at normal temperature (25° C.) using a planetary mixer for 30 minutes. Then, the component (D) (including d2 and d3) and the inorganic powder were introduced thereto, further mixed for 10 minutes, and dispersed using a three roll mill. Subsequently, the component (E) was introduced thereto and mixed together for 40 minutes. Thus, an epoxy resin composition was prepared. Thereafter, various physical properties were measured as follows. Note that specific prepared amounts followed Table 1, and all the numerical values were represented by "parts by mass."

The test methods conducted for Examples and Comparative Examples in Table 1 were as follows.
<Adhesive Properties>

Measurement of tensile shear bond strength: iron test pieces (SPCC-SD steel sheets, each 25 mm×100 mm×2.3 mm) were adhered to each other according to the following procedure. The composition was applied to an end portion of one of the test pieces and uniformly spread. Then, an end portion of the other test piece was placed thereon in such a manner that the adhesion interface was 25 mm in a width direction and 10 mm in a longitudinal direction. While fixed with a jig, the resultant was heated using a hot air drying furnace at 120° C. for 30 minutes, and thus cured. After the temperature of the test pieces returned to room temperature (approximately 25° C.), the prepared test pieces were measured using a tensile testing machine at a tensile speed of 10 mm/min to obtain the "tensile shear bond strength" (MPa). The test followed JIS K 6850 in detail. The strength of 30 MPa or more was rated as good, and the strength of less than 30 MPa was rated as poor.

Measurement of T-peel strength: iron test pieces each bent in an L shape (SPCC-SD steel sheets, each 25 mm×150 mm×0.5 mm, note that each test piece was bent in the L shape at a position 100 mm in length) were adhered to each other according to the following procedure. The composition was applied to a surface 100 mm in length of one of the test pieces and uniformly spread. Then, the other test piece was placed thereon such that the two formed a T shape. While fixed with a jig, the resultant was heated using a hot air drying furnace at 120° C. for 30 minutes, and thus cured. After the temperature of the test pieces returned to room temperature, the prepared test pieces were measured using a tensile testing machine at a tensile speed of 50 mm/min to obtain the "T-peel strength" (kN/m). The test followed JIS K 6854-3 in detail. The strength of 6 kN/m or more was rated as excellent, the strength of 5 kN/m or more but less than 6 kN/m was rated as good, and the strength of less than 5 kN/m was rated as poor.

TABLE 1

| Raw Materials | | Example 1 | Example 2 | Example 3 | Comparative Example 1 | Comparative Example 2 | Comparative Example 3 | Comparative Example 4 |
|---|---|---|---|---|---|---|---|---|
| Component (A) | a1 | 94 | 50 | 61 | 100 | 100 | 94 | 74 |
| | d2 (component (A) amount) | | 44 | | | | | |
| | d3 (component (A) amount) | | | 33 | | | | |
| Component (B) | b1 | 11 | 11 | 11 | 11 | 11 | 11 | |
| Comparison | b'1 | | | | | | | 32 |
| Component (C) | c1 | 6 | 6 | 6 | | | 6 | 6 |
| Component (D) | d1 | 11 | | | | 11 | | 11 |
| | d2 (component (D) amount) | | 11 | | | | | |
| | d3 (component | | | 11 | | | | |

TABLE 1-continued

| Raw Materials | | Example 1 | Example 2 | Example 3 | Comparative Example 1 | Comparative Example 2 | Comparative Example 3 | Comparative Example 4 |
|---|---|---|---|---|---|---|---|---|
| | (D) amount) | | | | | | | |
| Component (E) | e1 | 9 | 9 | 9 | 9 | 9 | 9 | 9 |
| | e2 | 4 | 4 | 4 | 4 | 4 | 4 | 4 |
| | e3 | 4 | 4 | 4 | 4 | 4 | 4 | 4 |
| Inorganic powder | calcium carbonate | 44 | 44 | 44 | 44 | 44 | 44 | 44 |
| Tensile shear bond strength | | good | good | good | poor | poor | poor | poor |
| T-peel strength | | good | excellent | excellent | poor | poor | poor | poor |

It can be seen from Table 1 that Examples 1 to 3 are thermosetting epoxy resin compositions from which cured products having high adhesive properties are obtained.

Meanwhile, Comparative Examples 1 to 3 are resin composition not containing the component (C) or the component (D) of the present invention or both. It can be seen that the tensile shear bond strengths and the T-peel strength are low. Moreover, Comparative Example 4 is a thermosetting epoxy resin composition containing not the component (B) of the present invention but the urethane-modified epoxy resin. It was verified that the tensile shear bond strength is low in comparison with Examples of the present invention. Comparative Examples 3, 4 are compositions of the above-described conventional techniques described in Patent Literatures 1, 2. It can be seen that the adhesive properties are insufficient in comparison with the present invention.

INDUSTRIAL APPLICABILITY

Because of high adhesive properties, the thermosetting epoxy resin composition of the present invention is quite effective as an adhesive and applicable in a wide range of fields. Therefore, the present invention is industrially useful.

The invention claimed is:

1. An epoxy resin composition comprising the following components (A) to (F), wherein the component (A) does not include the component (C):
    the component (A): an epoxy resin selected from the group consisting of bisphenol A epoxy resins, bisphenol F epoxy resins, and naphthalene epoxy resins;
    the component (B): a blocked urethane resin;
    the component (C): a NBR-modified epoxy resin;
    the component (D): rubber particles selected from the group consisting of acrylic rubbers and butadiene rubbers;
    the component (E): a latent curing agent which is a mixture of an amine adduct compound with an agent selected from the group consisting of dicyandiamide, derivatives of dicyandiamide, urea compounds, and derivatives of urea compounds; and
    the component (F): calcium carbonate,
    wherein a content of the component (B) is 3 to 30 parts by mass relative to 100 parts by mass of a total of the component (A) and the component (C),
    a content of the component (C) is 1 to 16% by mass of the total of the component (A) and the component (C),
    a content of the component (D) is 3 to 30 parts by mass relative to 100 parts by mass of the total of the component (A) and the component (C),
    a content of the component (E) is 3 to 20 parts by mass relative to 100 parts by mass of the total of the component (A) and the component (C), and
    a content of the component (F) is 1 to 100 parts by mass relative to 100 parts by mass of the total of the component (A) and the component (C).

2. The epoxy resin composition according to claim 1, comprising
    3 to 20 parts by mass of the component (B) and 5 to 20 parts by mass of the component (D) relative to 100 parts by mass of the total of the components (A) and (C), and
    1 to 9% by mass of the component (C) in the total of the components (A) and (C).

3. The epoxy resin composition according to claim 1, wherein the component (B) is a blocked urethane resin obtained from a urethane resin formed by reacting a polyalkylene polyol with a polyisocyanate compound.

4. The epoxy resin composition according to claim 1, wherein the component (A) is selected from the group consisting of the bisphenol A epoxy resins and the bisphenol F epoxy resins.

5. The epoxy resin composition according to claim 1, wherein the rubber particles of the component (D) have an average particle diameter of 0.1 to 0.5 μm.

6. A thermosetting adhesive for structure comprising the epoxy resin composition according to claim 1.

7. The thermosetting adhesive for structure according to claim 6, wherein the rubber particles of the component (D) have an average particle diameter of 0.1 to 1 μm.

8. A cured product obtained by curing the epoxy resin composition according to claim 1.

9. The cured product according to claim 8, wherein the rubber particles of the component (D) have an average particle diameter of 0.1 to 1 μm.

10. An adherend adhesion method comprising the steps of:
    disposing the epoxy resin composition according to claim 1 between a pair of adherends; and
    curing the epoxy resin composition by heating.

11. The adhesion method according to claim 10, wherein the heating is performed at 50° C. to 200° C.

12. The adhesion method according to claim 10, wherein the rubber particles of the component (D) have an average particle diameter of 0.1 to 1 μm.

13. The epoxy resin composition according to claim 1, wherein the rubber particles of the component (D) have an average particle diameter of 0.1 to 1 μm.

* * * * *